(12) United States Patent  
Berthold et al.

(10) Patent No.: US 11,611,270 B2  
(45) Date of Patent: Mar. 21, 2023

(54) METHOD FOR TRICKLE IMPREGNATION OF THE STATOR OR ARMATURE OF AN ELECTRIC MACHINE

(71) Applicant: copperING GmbH, Wernigerode (DE)

(72) Inventors: Jens Berthold, Hoym (DE); Stefan Schneider, Halberstadt (DE); Richard A. Rasp, Usingen (DE)

(73) Assignee: GEHRING TECHNOLOGIES GMBH + CO. KG, Ostfildern (DE)

( * ) Notice: Subject to any disclaimer, the term of this patent is extended or adjusted under 35 U.S.C. 154(b) by 672 days.

(21) Appl. No.: 16/489,411

(22) PCT Filed: Feb. 18, 2018

(86) PCT No.: PCT/DE2018/000033  
§ 371 (c)(1),  
(2) Date: Nov. 5, 2019

(87) PCT Pub. No.: WO2018/157876  
PCT Pub. Date: Sep. 7, 2018

(65) Prior Publication Data  
US 2020/0059143 A1     Feb. 20, 2020

(30) Foreign Application Priority Data

Feb. 28, 2017  (DE) .................... 10 2017 001 940.1

(51) Int. Cl.  
*H05B 6/06* (2006.01)  
*H05B 6/10* (2006.01)  
*H02K 15/12* (2006.01)

(52) U.S. Cl.  
CPC ............. *H02K 15/125* (2013.01); *H05B 6/06* (2013.01); *H05B 6/10* (2013.01)

(58) Field of Classification Search  
CPC .......... H02K 15/125; H05B 6/06; H05B 6/10; H05B 6/00; H05B 6/02; H05B 6/065;  
(Continued)

(56) References Cited

U.S. PATENT DOCUMENTS 3,456,615 A   7/1969  Zander et al.  
5,685,910 A   11/1997 Thigpen et al.  
(Continued)

FOREIGN PATENT DOCUMENTS

CA       803967 A     1/1969  
CN    101627526 A     1/2010  
(Continued)

OTHER PUBLICATIONS

Chinese Office Action for application No. 201880021249.8 dated Nov. 25, 2020 with English translation.  
(Continued)

*Primary Examiner* — Quang T Van  
(74) *Attorney, Agent, or Firm* — Carter, DeLuca & Farrell LLP

(57) ABSTRACT

A method for trickle impregnation of a stator or armature of an electric machine with a synthetic resin curing under temperature increase comprises heating the stator or the armature from an initial temperature to a trickle temperature range of the synthetic resin; keeping constant the temperature in the trickle temperature range and introducing the synthetic resin into the stator or the armature; heating the stator or the armature to a curing temperature range; keeping constant the temperature of the stator or the armature in the curing temperature range and setting and curing the synthetic resin to a duroplast; and cooling down the stator or the armature. The trickle temperature range has lower temperatures than the curing temperature range. The method includes inductively heating the stator or the armature. The  
(Continued)

stator or the armature may be disposed in an impregnation device.

14 Claims, 2 Drawing Sheets

(58) Field of Classification Search
CPC ........ H05B 6/101; H05B 6/102; H05B 6/103; H05B 6/104; H05B 6/105; H05B 6/106; H05B 6/107; H05B 6/108; H05B 6/36; H05B 6/40
USPC ........ 219/635, 652–654, 662, 674, 636, 672
See application file for complete search history.

(56) References Cited

U.S. PATENT DOCUMENTS

| | | | |
|---|---|---|---|
| 6,302,961 | B1 | 10/2001 | Robie et al. |
| 2010/0320194 | A1 | 12/2010 | Koide et al. |

FOREIGN PATENT DOCUMENTS

| | | | | |
|---|---|---|---|---|
| CN | 105359394 | A | | 2/2016 |
| DE | 01212204 | B | | 3/1966 |
| DE | 1538918 | A1 | | 11/1970 |
| DE | 1919642 | A1 | | 11/1970 |
| DE | 4334959 | A1 | | 4/1994 |
| DE | 102009045200 | A1 | | 4/2011 |
| DE | 102013017299 | A1 | * | 4/2015 ........... H01F 27/327 |
| DE | 112014002790 | T5 | | 3/2016 |
| EP | 0817358 | A1 | | 1/1998 |
| EP | 2110932 | A1 | | 10/2009 |
| JP | 2005086954 | A | * | 3/2005 |
| JP | 2005086954 | A | | 3/2005 |
| JP | 2010262828 | A | * | 11/2010 |
| JP | 2010262828 | A | | 11/2010 |
| JP | 2012005283 | A | | 1/2012 |

OTHER PUBLICATIONS

International Search Report and Written Opinion issued in corresponding PCT/DE2018/000033 dated Jun. 1, 2018, 11 pages.
German Examination Report issued in German Application No. 10 2017 001 940.1 dated May 28, 2019, 6 pages.

* cited by examiner

METHOD FOR TRICKLE IMPREGNATION OF THE STATOR OR ARMATURE OF AN ELECTRIC MACHINE

SUMMARY

The invention relates to a method for trickle impregnation of the stator or armature of an electric machine with a synthetic resin curing under temperature increase.

It is well known that during the manufacture of an electric machine, be it an electric motor or a generator, a stabilization of the windings of the stator and armature must be carried out. Today, this is usually done by means of a so-called trickle process and a corresponding impregnation device. To this purpose, the stator or armature is heated and clamped in the impregnation device with its longitudinal axis inclined, and is rotated about this longitudinal axis. However, the stator or armature can also be aligned horizontally. Then, a synthetic resin which is initially liquid at room temperature is trickled preferably on the higher positioned axial end of the stator or armature, for example on its winding head. The resin may comprise one or more components, for example a base resin and a hardener.

The volume flow rate with which the still liquid synthetic resin is applied to the stator or armature is adapted to the respective absorbing capacity of the same. After trickling on, the synthetic resin enters the interstices between the winding wires as well as the sheet stacks and fills these interstices completely. When the stator or armature is subsequently heated to a curing temperature of the synthetic resin, it solidifies and becomes a duroplast which, after this curing, cannot be deformed by re-heating. As a result, the components of the stator or armature that came into contact with the synthetic resin are fixedly connected to each other. The duroplast meets all the mechanical and electrical requirements made on a stationary or rotating electric machine.

In order to ensure optimum penetration of the initially liquid synthetic resin into the stator or armature, at least the stator or armature is heated to a so-called trickle temperature before the trickle process begins and is maintained at this temperature during the trickle process. The trickle temperature can be between 70° C. and 90° C. depending on the synthetic resin used. After a predetermined amount of the initially liquid synthetic resin has been introduced into the stator or armature, the latter is heated to a curing temperature, which is between 120° C. and 160° C., for example, also depending on the synthetic resin. This curing temperature is then maintained for a predetermined period of time to allow complete curing of the resin-hardener mixture. Finally, the stator or armature is cooled down to room temperature and provided for further manufacturing processes to produce the electric machine.

The heating of the stator or armature to the trickle temperature and the curing temperature can be performed in a suitable furnace. However, it is already known from DE 1 212 204 A and DE 19 19 642 A to achieve the heating of the stator or armature by means of an electrical heating current which is passed through the windings of the stator or armature. Since simply passing a heating current through the windings causes excessive deviations of the attainable actual temperatures from the desired set-point temperatures, it was suggested to ensure obtaining and maintaining the desired temperatures by regulating the heating current. Here the finding was used that in a winding the ohmic resistance increases with increasing temperature, so that the temperature of the winding can be inferred from the ohmic resistance. In DE 1 212 204 A it was therefore proposed that when the electric resistance value of the winding required for the presence of the trickle temperature or the curing temperature is reached, the heating current passed through the winding of the stator or armature is switched off. The heating current is switched on again only when a predetermined lower resistance value of the winding is measured, which is equivalent to falling below a lower limit temperature.

A disadvantage of these known processes and the devices used to impregnate a stator or armature of an electric machine is, however, that the temperature is controlled by means of a heating current passed through the winding, which must be fed into the rotating stator or armature in a technically complex manner. Moreover, the methods and devices proposed in the two publications have the deficiency that the regulation of the heating current is based solely on the temperature of the winding through which the heating current flows. This is unfavorable at least in those periods of time in which the other components surrounding the windings have not yet reached the temperature of the windings. Since the synthetic resin comes into contact not only between adjacent wires or wire sections of the windings, but also with other components of the stator or armature, the resulting temperature of the synthetic resin present there is not exactly known. Therefore, at least the heating phase until the trickle temperature is reached should be extended on the basis of experience until it can be assumed that the winding temperature determined by the electric resistance measurement is also present at all other components of the stator or armature. Only then the trickling of the synthetic resin into the stator or armature can be started with the desired process reliability. Since this uncertainty with respect to the temperatures of the stator or armature components and the synthetic resin is also present at the beginning of the curing process, the latter must also be disadvantageously extended by a safety period. Ultimately, it is considered adverse that the heating of the synthetic resin takes place only indirectly by heat transfer from the windings. As a result, reaching the trickle temperature and the curing temperature requires a comparatively long time.

The described time periods for impregnating a stator or armature result in an expensive extension of the production time as well as an increase of the energy costs for heating up and keeping the trickle and curing temperatures constant.

It is therefore an object of the invention to provide a method with which the impregnation of a stator or armature of an electric machine with a synthetic resin curing under the effect of heat can be carried out faster and with higher energy efficiency and higher cost efficiency than before.

This object is achieved by a method having the features of claim 1. Advantageous developments of this method are defined in the dependent claims.

The invention relates to a method for trickle impregnation of the stator or armature of an electric machine with a synthetic resin curing under temperature increase, comprising the following steps:

a) heating the stator or armature from an initial temperature to a trickle temperature range of the synthetic resin, which is initially still liquid, in a first period of time, b) keeping constant the temperature in the trickle temperature range and introducing the still liquid synthetic resin into the stator or armature in a second period of time, c) heating the stator or armature to a curing temperature range in a third period of time, d) keeping constant the temperature of the stator or armature in the curing temperature range in a fourth period of time and setting and curing the resin to a duroplast; and e) cooling down the stator or armature after the end of the fourth period of time, wherein the stator or armature is disposed in an impregnation device during introduction of the liquid synthetic resin, and wherein the trickle temperature range has lower temperatures than the curing temperature range. According to the invention, the heating of the stator or armature is performed inductively in this method.

During the introduction of the liquid synthetic resin, the stator or armature is preferably disposed in an impregnation device in which it can be inclined with its longitudinal axis relative to the horizontal and can be rotated about this longitudinal axis. The inclination facilitates the introduction of the synthetic resin into the stator or armature. A rotation of the stator or armature can improve uniform heating of the same during inductive heating, and can prevent any adverse accumulation of resin on the underside of the stator or armature.

The invention is based on the finding that a stator or armature for an electric machine can be brought very advantageously to the trickle temperature and the curing temperature and can be maintained at these temperatures by means of inductive heating. It is of particular importance that in all electrically conductive components of such a stator or armature, eddy currents which simultaneously heat these components are simultaneously generated by only one inductor. This significantly reduces the heating time and the electrical energy required in comparison to conventional impregnation methods. As a result, the manufacturing costs for the impregnation are reduced.

With this method, it is preferred that heating of all electrically conductive components of the stator or armature is carried out by means of electric eddy currents which are generated by a high-frequency or medium-frequency alternating magnetic field of an electromagnetic inductor. For this purpose, the inductor embraces the stator or armature radially on the outside like a ring or hollow cylinder. However, it is also possible that the inductor is arranged in a central, coaxial cavity of the stator.

The electrical eddy currents simultaneously heat all electrically conductive components of the stator or armature, i.e. the iron sheet stack frames, the sheets of the sheet stack, the winding wires and, via heat conduction, also the trickled (introduced) synthetic resin. In this way, other components or objects (such as insulation material) which are in contact with the electrically conductive components of the stator or armature are also indirectly brought to the desired trickle temperature or curing temperature.

According to another advantageous development of the inventive method, it may be provided that during the above method steps a) to d) the inductor is moved, coaxially to the longitudinal axis of the stator or armature, back and forth between at least two axially spaced positions. These two positions are defined, for example, by the two axial ends of the stator or armature. The average speed with which the inductor is moved back and forth is 5 to 50 millimeters per second, for example, including the range boundaries.

Due to the described movement of the inductor between the two axial end positions, it is possible to build the inductor axially advantageously short. In addition, moving the inductor back and forth ensures that axial sections of the stator or armature are only temporarily swept by the alternating magnetic field of the inductor. This allows the components of the stator or armature which are currently not covered by the inductor to transfer a part of their thermal energy to adjacent components.

A further measure for fast and damage-free heating of the stator or armature preferably comprises alternatingly switching the inductor on and off in accordance with a time interval, in order to reach and/or maintain a predetermined temperature, i.e. the trickle temperature and the curing temperature. The inductor is switched on when a set-point temperature of the stator or armature has not yet been reached, while the inductor is switched off when the respective set-point temperature has been reached. The set-point temperature may be slightly above the trickle temperature or above the curing temperature, since the subsequent switch-off and the subsequent brief waiting phase lead to a cooling down. In addition, the respective set-point temperature can have a value that depends on the elapsed time, especially during the heating-up phases.

The outside temperature of the stator is preferably measured contactlessly during method steps a) to d), for example by a suitable temperature sensor. This contactless temperature measurement is advantageous due to the rotation of the stator or armature during the trickle process and curing process, since it is not necessary to attach stationary temperature sensors to the stator or armature and to lead out their signals from the rotating system.

The contactlessly working temperature sensor is preferably connected to a control unit in which the measured temperature values are processed. The control unit switches the inductor on or off depending on reaching, exceeding or falling below the predetermined set-point temperatures. After switching off the inductor, the stator or armature both radiates heat to the outside and transfers heat to the inside. This heats up the interior of the stator or armature and thus also all insulating components arranged there, as well as the trickled (introduced) synthetic resin-hardener mixture. The process of temperature-controlled switching on and off of the inductor, with the waiting phase to be maintained in between, is repeated until the complete stator or armature has reached the desired trickle temperature or curing temperature. The described process is preferably used to maintain the trickle temperature or curing temperature once reached, or a trickle temperature range or curing temperature range, respectively, over a certain period of time.

According to a further method feature, the still liquid synthetic resin may be trickled onto the axially outward and higher positioned end of the winding of the stator or armature. The inclination angle of the stator or armature is, for example, 5° to 20° relative to the horizontal, including the range boundaries. This allows the resin to easily penetrate into the interior of the stator or armature following gravity.

Furthermore, it is preferred that after the end of the trickle process and before the start of heating the stator or armature to the curing temperature range, the stator or armature is positioned horizontally to avoid leakage of the synthetic resin therefrom.

The temperature of the stator or armature is 80° C. to 130° C. in a preferred trickle temperature range, and 140° C. to 170° C. in a curing temperature range, including the respective range boundaries.

During the trickle process and the curing process, the stator or armature is rotated around its longitudinal axis at a rotational speed of 5 to 40 revolutions per minute, for example, in order to achieve uniform distribution of the synthetic resin. These rotational speed specifications also include the range boundaries.

To ensure uniform heating and the maintenance of a predetermined trickle temperature or curing temperature, it may be provided that the speed control of the actuator is such that, over a predetermined period of time, the average dwell time of an electromagnetically active inductor in all regions of the stator or armature is approximately the same.

According to another measure leading to the same goal, it may be provided that the inductor is in operation when approaching an axial end of the stator or armature, but that the inductor is switched off when this end is reached, and that the inductor is not put into operation again until it has left this end region of the stator or armature by a predetermined distance.

DETAILED DESCRIPTION

Figure 1:
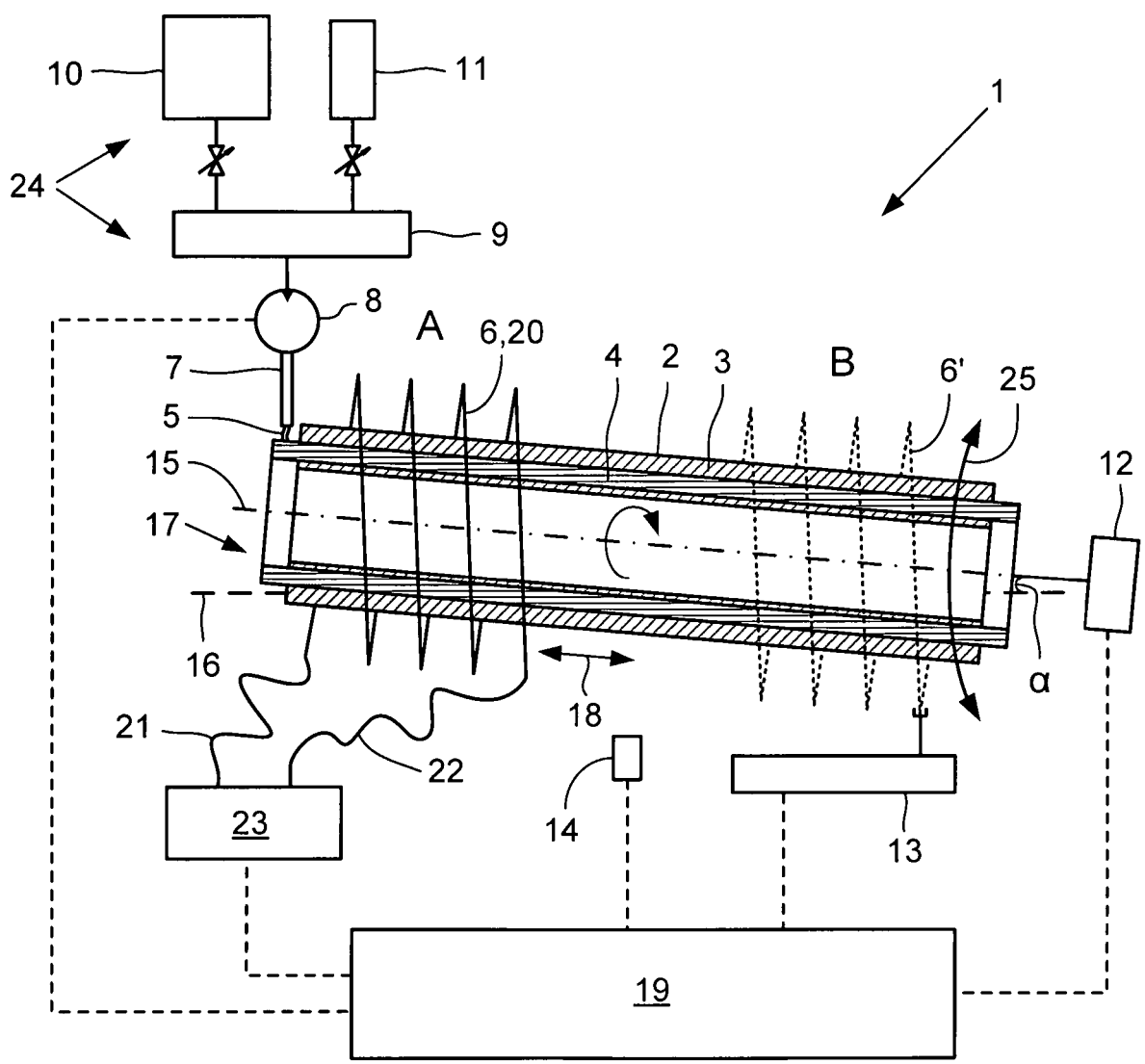
FIG. 1 is a schematic longitudinal section through a stator, which is treated in an impregnation device with the method according to the invention.

Accordingly, FIG. 1 in total shows an impregnation device 1 for a hollow cylindrical stator 2 which is shown in a schematic longitudinal section. A stator 2 treated in impregnation device 1 is intended for installation in an electric machine after its final completion. Stator 2 has, for example, a conventional structure with stator segments arranged in a ring shape, wherein each of these stator segments has a frame 3 to which sheets arranged in series are attached. Between respectively adjacent stator segments, stator windings 4 made of wires or by means of the well-known hairpin technology are arranged, the cable ends of which are led out to a winding head 17 located at an axial end. Moreover, stator 2 contains insulation material which is not shown and which separates components to be electrically separated from each other.

In impregnation device 1 not shown in detail, stator 2 is accommodated with its longitudinal axis 15 inclined at an inclination angle α relative to horizontal 16, wherein the inclination angle is 5° to 20° in the depicted embodiment. As mentioned above, the inclination angle can also be 0°. To adjust the inclination angle α, the stator 2 can be tilted by means of a pivoting device which is not shown. A respective pivoting movement 25 is indicated by a double arrow in FIG. 1.

Moreover, in the embodiment shown in FIG. 1, stator 2 is rotatably mounted in impregnation device 1 and can be driven around its longitudinal axis 15 by an electric drive motor 12. Drive motor 12 is connected to a control unit 19 of the device via a control cable which is not-denoted but dashed.

Stator 2 is coaxially surrounded by an inductor 6 in ring shape over a comparatively short portion, which is substantially designed as an electrical coil. Inductor 6 comprises a helically bent tube 20, through which a coolant can be led. As can be clearly seen, the axial length of the inductor 6 is shorter than the axial length of the stator 2. The inductor 6 is connected via flexible cables 21, 22 to a voltage source 23, which operates as a frequency converter and can generate an alternating voltage of the desired frequency. During operation of inductor 6, an alternating current flows through the material of helical tube 20 and generates an alternating magnetic field that generates eddy currents in all electrically conductive components of stator 2, which heat these components simultaneously. Adjacent electrically insulating materials of stator 2 are also heated by heat radiation or heat conduction.

Inductor 6 is arranged coaxially slidable to stator 2 by means of an actuator 13. This actuator 13 is connected to control unit 19 via a control cable shown dashed. Using actuator 13, inductor 6 can be moved back and forth between a first axial end position A and a second axial end position. These directions of movement 18 of inductor 6 are illustrated by a double arrow. FIG. 1 shows inductor 6' in the second end position B with a dotted line.

There is also a temperature sensor 14 which can measure the surface temperature of stator 2. The temperature measurement is performed contactless and temperature sensor 14 is connected to control unit 19 via a sensor cable shown dashed.

As further shown in FIG. 1, impregnation device 1 also includes a trickle device 24 which is shown here as an example, and which includes a first container 10 for a synthetic resin 5 which is liquid at room temperature, and a second container 11 for a liquid hardener. Synthetic resin and hardener are fed in a predetermined quantity ratio via not further specified valves into a mixing container 9. Synthetic resin 5 is led by means of a pump 8 from mixing container 9 to at least one trickle nozzle 7, with which the synthetic resin 5 can be trickled onto winding head 17 of stator 2 with a comparatively low flow rate. The flow rate is adjusted such that just that amount of synthetic resin 5 is applied to winding head 17 that can be absorbed by stator 2 for filling its cavities. As already mentioned, a one-component synthetic resin can also be used, which also solidifies to a duroplast with increasing temperature. In this case, the second container 11, the second valve and the mixing container 9 can be omitted.

Figure 2:
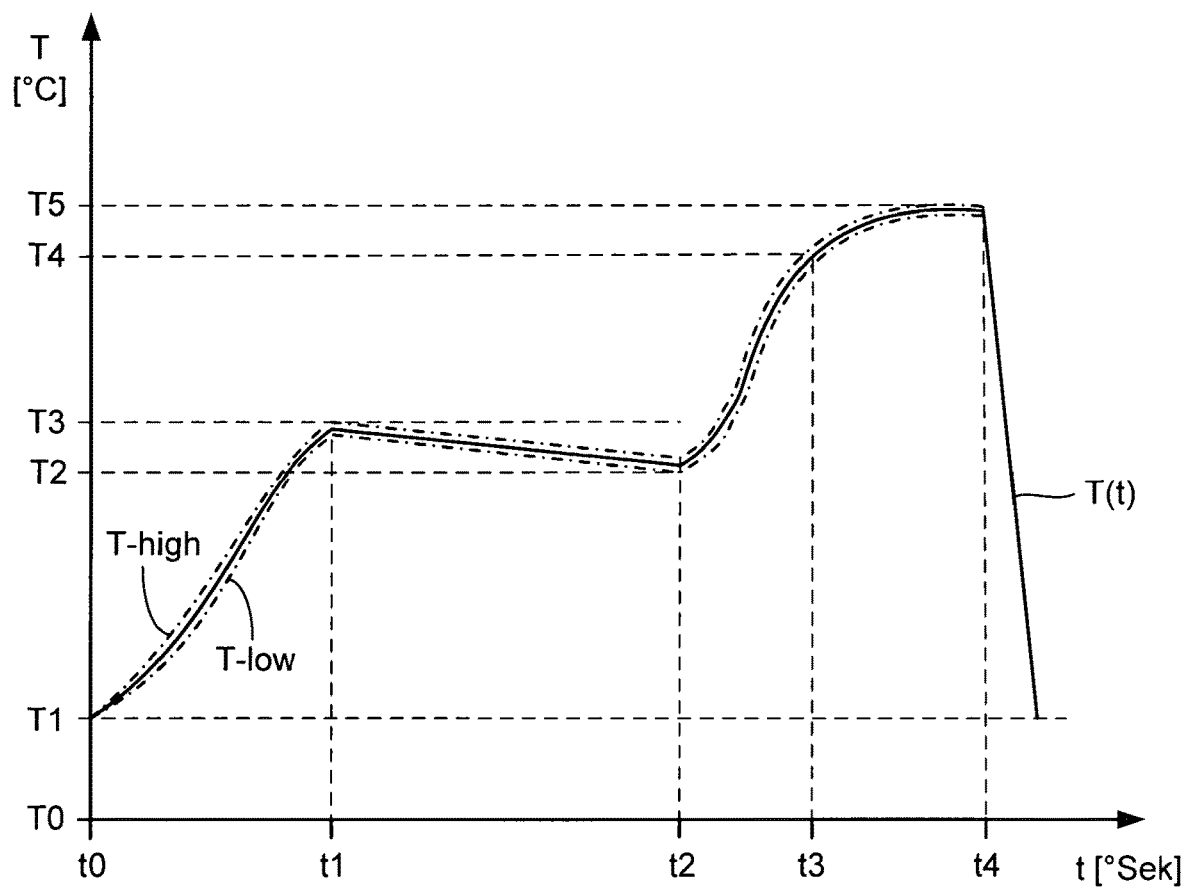
FIG. 2 is a diagram in which the temperature curve of a stator treated according to the procedure is shown versus time.

FIG. 2 illustrates the curve T(t) of temperature T of stator 2 versus time t during trickle impregnation of the same with impregnation device 1 according to FIG. 1. Starting at time t0, the temperature T1 of stator 2 is identical to the ambient room temperature. First, drive motor 12 and actuator 13 are switched on by control unit 19. Thus, in the embodiment shown, stator 2 rotates around its longitudinal axis 15, and actuator 13, which can be designed as a pneumatic piston-cylinder arrangement or as an electric actuator, pushes inductor 6 back and forth between the two axial end positions A and B. By switching on voltage source 23 by means of control unit 19, inductor 6 is put into operation regarding its electromagnetic function, so that an alternating electric current with a predetermined frequency flows through flexible power cables 21, 22 and helical tube 20 of inductor 6. In this way, inductor 6 generates an alternating magnetic field which induces eddy currents in all electrically conductive components of stator 2, resulting in a heating of the same and indirectly also of adjacent, non-electrically conductive components of stator 2.

For inductive heating of stator 2 or the armature it is not absolutely necessary that the stator rotates around its longitudinal axis 15 during operation of inductor 6. However, in case of a non-uniform structure of inductor 6 which differs from a homogeneous coil, this rotation is advantageous. In addition, the rotation of stator 2 or the armature ensures that synthetic resin 5, which has not yet gelled or solidified, accumulates in the lower area of stator 2 or the armature following gravity, and consequently, leaks unintentionally from the same in axial direction.

Since inductor 6 has a comparatively small axial length in comparison to stator 2, and is constantly moved back and forth by actuator 13 between the two axial end positions A, B, a substantially uniform heating of all components of stator 2 can be achieved. When after a heat treatment of the first axial end section of stator 2, the inductor 6 has left this location towards the second axial end section, the heat present at the first end section of stator 2 can be transferred inside stator 2 to all the components there, so that even electrically non-conductive components of stator 2 are heated comparatively uniformly together with the electrically conductive components. This also avoids too fast and too strong heating of the metallic components of stator 2, for example, which would otherwise damage non-metallic components of stator 2, such as materials for electrical insulation. The same also occurs at the second axial end section of stator 2 and in the axially interposed region of stator 2.

In order to prevent the dwell time of an electromagnetically active inductor 6 in the area of the axial ends of stator 2 from becoming unfavorably long due to its deceleration and re-acceleration in the opposite moving direction, it may be provided that due to an adapted speed control of actuator 13, the dwell time of inductor 6 in all areas of stator 2 is approximately the same.

Another possibility to achieve an axially uniform heating of stator 2 is not to permanently operate the inductor 6 in the area of the two axial ends of stator 2. For example, it can be provided that inductor 6 is still in operation when approaching an axial end of stator 2, but is switched off when it reaches this end, and that inductor 6 is put into operation again when it has left this end region of stator 2 by a predetermined distance.

Figure 3:
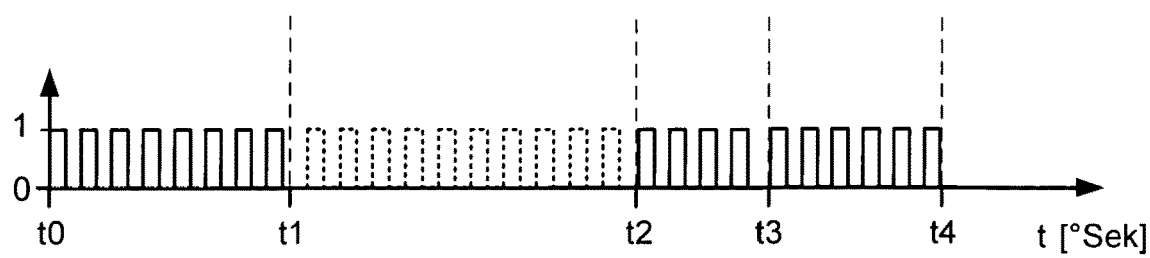
FIG. 3 is a schematic switching diagram which illustrates switch-on states and switch-off states of the inductor of FIG. 1.

As shown in FIG. 2, inductor 6 is operated such that starting from initial temperature T1 stator 2 is inductively heated. As illustrated in FIG. 3, this is also done, for example, by alternatingly switching inductor 6 on and off, wherein in FIG. 3 the switched-on state of inductor 6 is denoted by numeral 1 and the switched-off state by numeral 0. Inductor 6 is preferably switched on and off in a controlled manner, depending on the outside temperature of stator 2 measured by temperature sensor 14. If control unit 19 determines that outside temperature T of stator 2 has exceeded a predetermined upper set-point temperature value T-high, inductor 6 is briefly switched off. If the temperature then falls below a lower set-point temperature value T-low, inductor 6 is switched on again. These set-point temperature values can be defined depending on the time t which has already elapsed. FIG. 2 shows that due to the control described, the outside temperature T of stator 2 is always within a temperature range which is limited by the curves for the lower set-point temperature value T-low and the upper set-point temperature value T-high.

After completion of the first heating phase in the first period of time t0-t1, the outside temperature T of the stator and thus also its inside temperature have reached a temperature value which lies within a so-called trickle temperature range T2-T3. During the following trickle phase in a second period of time t1-t2, the control of the impregnation device 1 ensures that the temperature T of stator 2 remains within this trickle temperature range T2-T3. This is done by the necessary switching on and off of inductor 6, and by the described reciprocating motion of the inductor 6 coaxial to stator 2. During this trickle phase, the still liquid synthetic resin 5 is supplied to the winding head 17, and thus, to the interior of stator 2 by means of pump 8 which is controlled by control unit 19.

Due to the already mentioned inclination of stator 2 and its constant rotation around its longitudinal axis 15, synthetic resin 5 is distributed evenly in stator 2 and thus fills all interstices previously filled with air. At the end of the trickle phase, i.e. when a predetermined quantity of synthetic resin 5 has been trickled into stator 2 or the armature, stator 2 or the armature is positioned horizontally in order to prevent synthetic resin 5 from leaking out of stator 2 during the subsequent phase of heating to the curing temperature (T2-T3).

It can also be seen in FIG. 3 from the dashed switch-on pulses, that during the second period of time t2-t3, i.e. during the trickle process, inductor 6 can be switched off, provided that the temperature does not fall below the lower temperature limit T2 of the trickle temperature range T2-T3. This can be advantageous for further energy savings, for example, with small stators or armatures and comparatively short trickle periods.

After the end of the trickle phase, a third period of time t2-t3 begins in which stator 2 is inductively heated by means of inductor 6 to a curing temperature which lies within a predetermined curing temperature range T4-T5. During the temperature increase to the curing temperature and during the subsequent curing, a substantially identical and constant internal and external temperature of stator 2 is achieved by continuously moving inductor 6 back and forth and by switching it on and off in a temperature-controlled manner.

After the thermoset has cured in stator 2 at time t4, inductor 6 and actuator 13 are switched off and stator 2 is removed from impregnation device 1 and temporarily stored for cooling down to room temperature T1.

The presented method for trickle impregnation of a stator 2 or armature of an electric machine is characterised by its simple controllability as well as fast and homogeneous heating of stator 2 or the armature. In comparison to known methods, it enables a substantially simultaneous heating of all components of stator 2 or the armature, without the risk that, for example, thermally less stable components, such as insulation materials, are burning due to overheating or are at least impaired in their intended properties. In addition, the induction heating of stator 2 or armature is due to its higher thermal efficiency much more energy efficient than heating of the same in a heating furnace or by means of an electric heating current passing through the winding of the stator or armature, because in the latter case only the winding wires are used to heat the stator or armature, while induction heating of the stator or armature heats all the electrically conductive components simultaneously. Finally, when using the method according to the invention, none of the winding wires needs to be connected to an electrical voltage source and supplied with a heating current, so that the mounting process in the impregnation device 1 is significantly reduced in comparison to the heating current method. All in all, the mentioned advantages result in a significant reduction of production time, and thus, of manufacturing costs.

Figure 4:
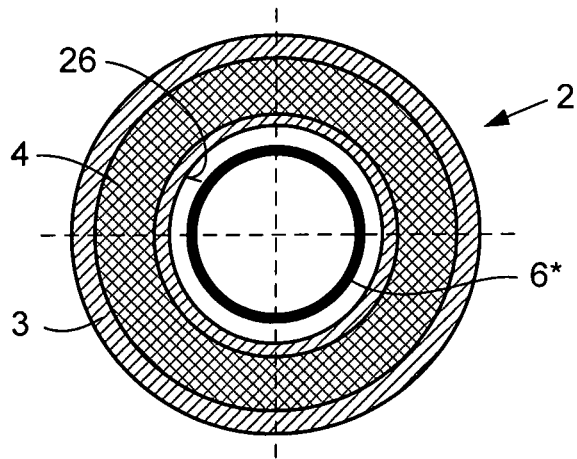
FIG. 4 is a schematic cross-section through a stator, wherein an inductor is arranged coaxially within its cylindrical cavity.

FIG. 4 shows that the process for trickle impregnation according to the invention can also be used to heat a stator 2 from the radial inside. For this purpose, an inductor 6* with a helical configuration, for example, is arranged coaxially in a cylindrical cavity 26 of stator 2. If required, this inductor 6* can also be moved axially back and forth and controlled as described with regard to its activation. The heating of all components of stator 2 is then performed as already explained.

LIST OF REFERENCE SIGNS 1 impregnation device
2 stator
3 frame of the stator
4 winding of stator, stator winding
5 synthetic resin, synthetic resin-hardener mixture
6 inductor (in a first axial end position)
6' inductor (in a second axial end position)
6* inductor (arranged coaxially in the stator)
7 trickle nozzle
8 pump
9 mixing container
10 container for resin
11 container for hardener
12 drive motor
13 actuator for axial displacement of the inductor
14 temperature sensor
15 longitudinal axis of the stator
16 horizontal
17 winding head of the stator
18 moving direction of the inductor
19 control unit
20 helical tube of the inductor
21 first flexible power cable
22 second flexible power cable
23 voltage source; frequency converter
24 trickle device
25 pivoting movement of the stator or armature relative to the horizontal
26 hollow cylindrical interior of the stator
A first axial position
B second axial position
α inclination angle of the stator
t time
t1-t4 time points
T1 initial temperature; room temperature
T2 lower trickle temperature
T3 upper trickle temperature
T4 lower curing temperature
T5 upper curing temperature
T2-T3 trickle temperature range
T4-T5 curing temperature range

The invention claimed is:

1. A method for trickle impregnation of a stator or armature of an electric machine with a synthetic resin curing under temperature increase, comprising:
   a) heating the stator or the armature from an initial temperature (T1) to a trickle temperature range (T2-T3) of the synthetic resin, which is initially still liquid, in a first period of time (t0-t1);
   b) keeping constant a temperature of the stator or the armature in the trickle temperature range (T2-T3) and introducing the synthetic resin, which is still liquid, into the stator or the armature in a second period of time (t1-t2);
   c) heating the stator or the armature to a curing temperature range (T4-T5) in a third period of time (t2-t3);
   d) keeping constant the temperature of the stator or the armature in the curing temperature range (T4-T5) in a fourth period of time (t3-t4) and setting and curing the synthetic resin to a duroplast; and
   (e) cooling down the stator or the armature after the end of the fourth period of time (t3-t4),
   wherein the stator or the armature is disposed in an impregnation device during the introduction of the synthetic resin, which is liquid,
   wherein the trickle temperature range (T2-T3) has lower temperatures than the curing temperature range (T4-T5), and
   wherein the heating of the stator or the armature is performed inductively, by an inductor,
   wherein during the one or more method steps a) to d), the inductor is moved coaxially to the longitudinal axis of the stator or the armature back and forth between at least two axially spaced positions (A, B),
   wherein a speed of the inductor is five to fifty millimeters per second, including range boundaries.

2. The method according to claim 1, wherein a heating of all electrically conductive components of the stator or the armature is carried out by means of electric eddy currents which are generated by a high-frequency alternating magnetic field of an electromagnetic inductor which embraces the stator or the armature radially on the outside like a ring or hollow cylinder.

3. The method according to claim 1, wherein a heating of all electrically conductive components of the stator is carried out by electric eddy currents which are generated by a high-frequency or medium-frequency alternating magnetic field of an electromagnetic inductor which is arranged in a central, coaxial cavity of the stator.

4. The method according to claim 1, wherein during the introduction of the synthetic resin, which is liquid, the stator or the armature is arranged in the impregnation device with its longitudinal axis inclined relative to the horizontal and/or is rotated about this longitudinal axis.

5. The method according to claim 1, characterized in that during the one or more method steps a) to d), an outside temperature of the stator or the armature is contactlessly measured.

6. The method according to claim 5, wherein the inductor is alternatingly switched on and off in accordance with a time interval, in order to reach and/or maintain a predetermined temperature (T2, T3, T4, T5) of the stator or the armature.

7. The method according to claim 5, wherein the inductor is switched on or off depending on the outside temperature of the stator or the armature.

8. The method according to claim 1, wherein the synthetic resin, which is still liquid, is trickled onto an axially outward and higher positioned end of the winding of the stator or the armature.

9. The method according to claim 8, wherein an inclination angle (a) of the stator or the armature is 5° to 20° relative to the horizontal, including range boundaries.

10. The method according to claim 1, wherein after an end of the trickle process and before a start of the heating of the stator or the armature to the curing temperature range (T4-T5), the stator or the armature is positioned horizontally to avoid leakage of the synthetic resin therefrom.

11. The method according to claim 1, wherein the temperature of the stator or the armature is 80° C. to 130° C. in the trickle temperature range (T2-T3) and 140° C. to 170° C. in the curing temperature range (T4-T5), including respective range boundaries.

12. The method according to claim 1, wherein a rotational speed of the stator or the armature is five to forty revolutions per minute, including range boundaries.

13. The method according to claim 1, wherein a speed control of an actuator is such that, over a predetermined period of time, an average dwell time of an electromagnetically active inductor in all regions of the stator or the armature is approximately the same.

14. The method according to claim 1, wherein the inductor is in operation when it approaches an axial end of the stator or the armature, in that the inductor is switched off when this axial end is reached, and in that the inductor is not put into operation again until it has left this end region of the stator or the armature by a predetermined distance.

* * * * *